United States Patent [19]
Kurzynski et al.

[11] Patent Number: 5,465,720
[45] Date of Patent: Nov. 14, 1995

[54] AUTOMATED QUALITATIVE IMAGE QUALITY FOR ULTRASOUND IMAGES

[75] Inventors: David W. Kurzynski, Waukesha; Sussan Pourjavid, Milwaukee, both of Wis.

[73] Assignee: General Electric Company, Milwaukee, Wis.

[21] Appl. No.: 344,928

[22] Filed: Nov. 25, 1994

[51] Int. Cl.$^6$ .............................. A61B 8/00; G01N 29/00
[52] U.S. Cl. ...................... 128/660.01; 73/1 DV
[58] Field of Search .................... 367/1, 13; 128/660.01, 128/660.07, 661.09; 73/1 DV, 1 R

[56] References Cited

U.S. PATENT DOCUMENTS

| | | | |
|---|---|---|---|
| 4,417,582 | 11/1983 | Trimmer et al. | 73/1 DV |
| 4,903,523 | 2/1990 | Flynn | 73/1 DV |
| 5,230,339 | 7/1993 | Charlebois | 128/660.01 |
| 5,250,952 | 10/1993 | Roth | 342/25 |

Primary Examiner—Francis Jaworski
Attorney, Agent, or Firm—B. Joan Haushalter; John H. Pilarski

[57] ABSTRACT

An automated qualitative image quality method is used for an ultrasound imaging system. Initially, an impulse response of the system is determined. The impulse response is used with a cystic filling determination to achieve automated qualitative image quality for the ultrasound imaging system. The impulse response of the system is determined using a wire-in-water test. That is, a wire target is put in a water tank. Next, a transducer is set to be perpendicular to the axis of the wire, to get a cross-section of the wire. Sound waves are transmitted and reflected echoes are received at different gain settings. Curve fitting techniques are then used to form a system beam profile. Finally, acoustic peak to noise and detail resolution qualitative image quality measurements are made using the system beam profile. The cystic filling of the system is determined by defining a first region of interest in a darkened region of an image and a second region of interest in a surrounding region of the image. Collected data is then used to calculate a cystic filling measurement.

2 Claims, 3 Drawing Sheets

AUTOMATED QUALITATIVE IMAGE QUALITY FOR ULTRASOUND IMAGES

TECHNICAL FIELD

The present invention relates to ultrasound imaging and, more particularly, to an automated image quality assessment technique for ultrasound imaging systems.

BACKGROUND ART

Ultrasound imaging systems generate ultrasonic echoes from deliberately launched diagnostic sound waves into tissue. The ultrasonic echoes are attenuated in proportion to the distance that the sound waves must travel to reach the reflector, plus the distance that the resulting echoes must travel back to reach the receiver. The ultrasounds are displayed on a screen, providing medical information for the operator.

Assessing the image quality of Ultrasound images has been a subjective science at best. What seems like a "good" quality image to one doctor may be described as a "poor" quality image to another. The subjective nature of image quality has also made it difficult to accurately judge the variation of image quality of a system over time. To overcome the subjective nature of image quality assessment, the principle of Quantitative Image Quality (QIQ) has been developed to correspond measurable numbers to the quality of an image. Generally, there are three characteristics of image quality that QIQ measures-Acoustic Peak To Noise (Signal-to-Noise), Detail Resolution (20 dB Width) and Cystic Clearing (Contrast Resolution). To date, the means of measuring these quantities has been time-consuming and cumbersome. First, an engineer acquires many sets data from an Ultrasound image, via a "screen-grabber" or other off-line tool. The settings of the Ultrasound system to be set precisely in order to ensure that accurate data was collected. Once the raw data is collected, the data is analyzed and interpreted (again by off-line tools), finally producing the QIQ numbers from the manipulated data. This entire process, requiring the expertise of a very knowledgeable Ultrasound engineer, is a lengthy process.

It is seen then that it would be desirable to be able to automatically, using only the Ultrasound machine and a phantom, determine QIQ statistics in a quick and accurate manner.

SUMMARY OF THE INVENTION

The present invention provides for the ability to automatically determine QIQ statistics in a quick and accurate manner. Automated QIQ tools will allow for quick, objective and accurate assessment of image quality by virtually anyone, including system developers, manufacturers and service engineers. Periodic QIQ image assessment can also be used to keep a "health" history of the machine. The difficult task of automating QIQ measurements lie in making the software algorithms perform exactly as a human would, including making the same judgements as a human would when manipulating the data.

In accordance with one aspect of the present invention, an automated qualitative image quality method is used for an ultrasound imaging system. Initially, an impulse response of the system is determined. The impulse response is used with a cystic filling determination to achieve automated qualitative image quality for the ultrasound imaging system. The impulse response of the system is determined using a wire-in-water test. That is, a wire target is put in a water tank. Next, a transducer is set to be perpendicular to the axis of the wire, to get a cross-section of the wire. Sound waves are transmitted and reflected echoes are received at different gain settings. Curve fitting techniques are then used to form a system beam profile. Finally, acoustic peak to noise and detail resolution qualitative image quality measurements are made using the system beam profile. The cystic filling of the system is determined by defining a first region of interest in a darkened region of an image and a second region of interest in a surrounding region of the image. Collected data is then used to calculate a cystic filling measurement.

Accordingly, it is an object of the present invention to provide automated qualitative image quality for ultrasound images. It is another object of the present invention to provide QIQ which is accurate and reliable. It is a further object of the present invention to provide accurate QIQ quickly.

Other objects and advantages of the invention will be apparent from the following description, the accompanying drawings and the appended claims.

DETAILED DESCRIPTION OF THE PREFERRED EMBODIMENTS

The present invention provides for the ability to automatically, using only the ultrasound machine and a phantom, determine QIQ statistics in a quick and accurate manner. The phantom is representative of an ultrasound imaging system for imitating an actual ultrasound imaging system. The automated QIQ technique according to the present invention allows for quick, objective and accurate assessment of image quality by virtually anyone, including system developers, manufacturers and service engineers. Periodic QIQ image assessment can also be used to keep a "health" history of the machine. The automated QIQ technique of the present invention is unique in that it performs exactly as a human would, including making the same judgements as a human would when manipulating the data.

The design for automating QIQ is heavily influenced by the need for accurate and reliable data. The Ultrasound system parameters are first set to a known, fixed state. After the user positions a phantom used in conjunction with the test, all system controls are locked so that the user can not cause any deviations from the fixed settings of the system. The combination of setting the machine to a fixed state and locking out operator controls allow the QIQ measurements to be accurately reproduced and compared from test-to-test on a particular system and between systems. Data is then automatically collected by the Ultrasound machine.

Figure 1:
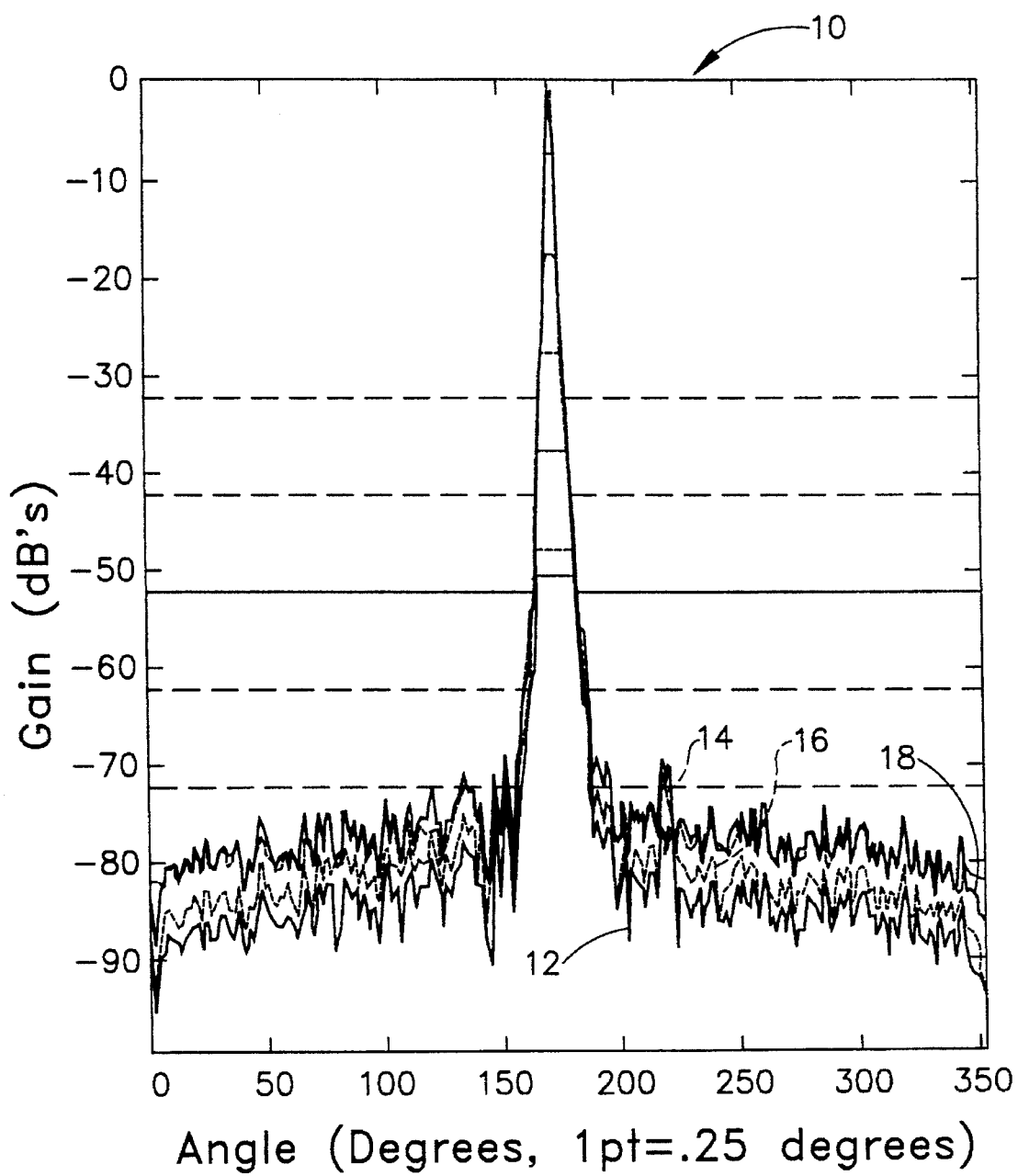
FIG. 1 illustrates a graphical representation of a beam profile at varying gains, to provide raw data.
Figure 2:
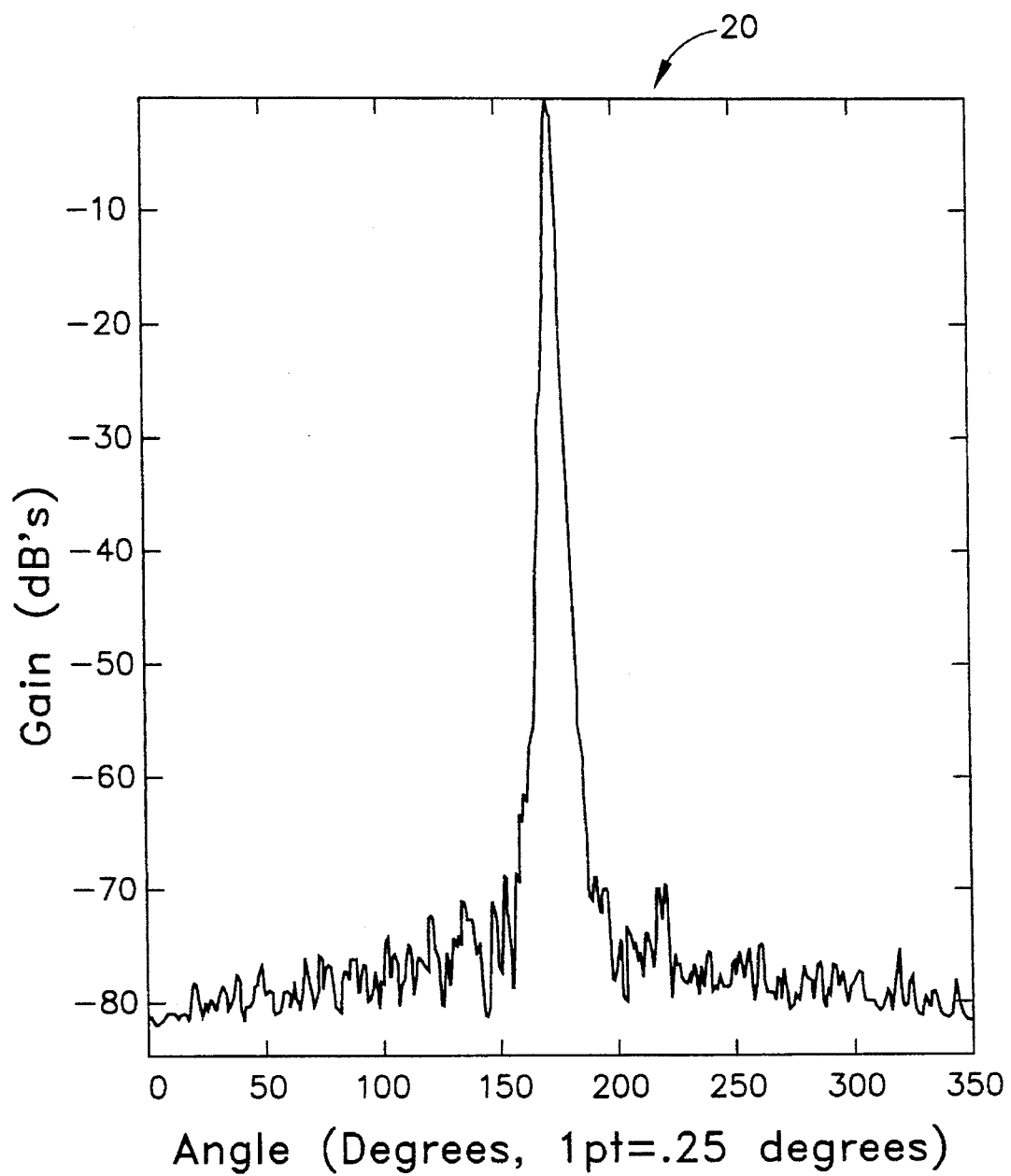
FIG. 2 illustrates a graphical representation of a final beam profile for determining system impulse responding in accordance with the present invention.

In the case of acoustic peak to noise and detail resolution, a "beam profile" 10 is generated by insonifying a wire-in-water phantom and collecting the returned echoes at multiple gain. settings, as best illustrated in FIG. 1. Data sets 12, 14, 16, 18 that were acquired at varying gain ranges are then manipulated using curve-fitting techniques, such as is defined by the following algorithm. The method of the present invention is carried out by means of a programmed computer of conventional design. An appropriate source code listing for effecting this method, and forming a final system beam profile 20, as illustrated in FIG. 2, follows.

```c
/*
*$$ calc_final_beam_prof
* DESCRIPTION:
* This routine handles combining all the acquired gain curves into
* one final "beam profile."
*
* ALGORITHM:
*
* OPERATOR FEEDBACK:
*
* GLOBAL VARIABLES:
* Name           Description (Read/Write)
*
*$!
* SPECIAL TEST CONSIDERATIONS BEYOND UNIT TEST:
*
* TEST PROGRESS:
*$END $!
*
*$@
* AUTHOR            DATE              COMMENT
*----------------------------------------------------------------
* D. Kurzynski      01-MAR-94         Created Routine
*
*$END $@
*/
int calc_final_beam_prof(void)
/*$END $$ */
{
    SINT16    sys_index;           /* Current gain curve.                   */
    SINT16    sys_index_next;      /* Gain curve used for comparison.       */
    SINT16    pt_index;            /* Current point on final curve.         */
    SINT16    last_switch_pt;      /* Last point at which a switch occured. */
    BOOLEAN   in_noise;            /* FLAG to indicate near the noise region.*/
    SINT16    local_max_index;     /* Index of max point of first curve.    */
    float     local_max = 0;       /* Max value of first curve.             */
    float     pt_diff0;            /* Var. used to track the difference     */
                                   /* between points on adjacent curves.    */
    float     pt_diff1;            /* Var. used to track the difference     */
                                   /* between points on adjacent curves.    */
    float     pt_diff2;            /* Var. used to track the difference     */
                                   /* between points on adjacent curves.    */
    float     max_diff;            /* Diff. between max and current pt.     */
                                   /* Used to determine if near the noise reg.*/
    float     noise_level;         /* Level used to check if near the noise reg. */
    float     noise_std;           /* Level used to see if curve has noise. */
    SINT16    curve_start;         /* Number fo curves to try to start final */
                                   /* before bailing out.                   */
    float     total;               /* Used to calculate mean & std.         */
    INT8      total_index;         /* Used to calculate mean & std.         */
    float     mean;                /* Used for std calc.                    */
    float     temp_var;            /* Used for std calc.                    */
    int       num_pts_std;         /* Numbers of points to use for init. std dev.*/
    float     stddev[MAX_SYS_GAIN_PASSES]; /* Standard dev of the "noise"   */
                                   /* region of all curves. Used as a criteria */
                                   /* to switch curves.                     */

/* Set parameters for curve switching criteria. */
    noise_level  = 60.0;
    noise_std    = 1.0;
    num_pts_std  = 40;
    curve_start  = 3;

/* Find maximum of starting curve. */
```

```
for (pt_index = 0; pt_index < (SINT16)profile_index; pt_index++)
{
    if ( data_db[num_curves - 1][pt_index] > local_max)
    {
        local_max = data_db[num_curves-1][pt_index];
        local_max_index = pt_index;
    }
}

/* Calculate standard deviation for the initial (0-10) degree area of each curve. */
for (sys_index = 0; sys_index < num_curves; sys_index++)
{
    total       = 0;
    total_index = 0;

/* First calc mean. */
    for ( pt_index = 0; pt_index < num_pts_std; pt_index++)
    {
        /* Keep running sum for average calc. */
        total = total + data_db[sys_index][pt_index];

/* Increment total count. */
        total_index++;
    } mean = total / total_index;
    total = 0;

/* Second, calc std. */
    for ( pt_index = 0; pt_index < num_pts_std; pt_index++)
    {
        /* Keep running sum for std calc. */
        temp_var = data_db[sys_index][pt_index] - mean;
        total = total + (temp_var * temp_var);
    } total = total / (total_index - 1);

/* Calculate standard deviation. */
    stddev[sys_index] = (float) sqrt( (double)total);
}

/* Set indices to start curve calculation. */
sys_index = num_curves - 1;
sys_index_next = sys_index - 1;
pt_index = local_max_index;

last_switch_pt = pt_index;
in_noise = FALSE;

/* Piece first half of curve together (from max of curve to point 0). */
while (pt_index >= 0)
{
    /* If not in the noise region. */
    if (in_noise == FALSE)
    {
        /* Calculate abs. value of diff. between point on this curve and */
        /* corresponding point on the adjacent curve (one curve below). */
        pt_diff0 = (float)fabs( (double)(data_db[sys_index][pt_index] -
                                         data_db[sys_index_next][pt_index]) );

/* Calculate diff. between point on this curve and */
        /* corresponding point on the adjacent curve (one curve below). */
        pt_diff1 = (float)(data_db[sys_index][pt_index] -
```

```
                    data_db[sys_index_next][pt_index]);

/* Calculate diff. between next point on this curve and */
/* corresponding point on the adjacent curve (one curve below). */
pt_diff2 = (float)(data_db[sys_index][pt_index - 1] -
                   data_db[sys_index_next][pt_index - 1]);

/* If the difference is less than the delta or the sign of */
/* of the differences of the adjacents points are opposite */
/* the curves cross each other, process accordingly.       */
if (   (pt_diff0 <= cross_delta)
    || ( (pt_diff1 < 0) && (pt_diff2 > 0) && (pt_index > 0) )
    || ( (pt_diff1 > 0) && (pt_diff2 < 0) && (pt_index > 0) ) )
{
    /* Move to the curve below. */
    sys_index = sys_index_next;
    sys_index_next--;

/* Remember where switch occurred. */
    last_switch_pt = pt_index;
}

/* Place current point in final profile.*/
data_db_final[pt_index] = data_db[sys_index][pt_index];
data_curve[pt_index] = sys_index;

/* Check to see if in the 'noise' region. */
max_diff = (float)fabs( (double)(data_db_final[local_max_index] -
                        data_db[sys_index][pt_index]) );

/* If near noise region, set flag. */
if (   (max_diff > noise_level)
    && (stddev[sys_index] > noise_std) )
{
    in_noise = TRUE;
}

/* Move to the next point. */
pt_index--;

/* Checking for a 'bad' curve and correct if necessary. */
if (pt_index < 0)
{
    pt_index = last_switch_pt;

/* No curve underneath touches current curve */
    /* and still haven't found 1st curve.        */
    if (   (sys_index_next == 0)
        && (sys_index > (num_curves - curve_start)) )
    {
        sys_index--;
        sys_index_next = sys_index - 1;
        pt_index = local_max_index;
        last_switch_pt = pt_index;
    }

/* Else if found 1st curve and no curve underneath */
    /* touches current curve.  - ERROR condition.      */
    else if (sys_index_next == 0)
    {
        /* Report error. */
        return(1);
    }
    /* Else, proceed to the next curve below for comparison. */
```

```
            else
            {
                sys_index_next--;
            }
        }
    }

/* In noise, just follow current curve to finish. */
    else
    {
        /* Place current point in final profile.*/
        data_db_final[pt_index] = data_db[sys_index][pt_index];
        data_curve[pt_index] = sys_index;

/* Move to the next point. */
        pt_index--;
    }
}

/* Set indices to start curve calculation. */
/* Start 2nd half on the curve which it was determined the 1st half starts. */
sys_index = data_curve[local_max_index];
sys_index_next = sys_index - 1;
pt_index = local_max_index;

last_switch_pt = pt_index;
in_noise = FALSE;

/* Piece second half of curve together (from max of curve to last point). */
while (pt_index < (SINT16)profile_index)
{
    /* If not in the noise region. */
    if (in_noise == FALSE)
    {
        /* Calculate abs. value of diff. between point on this curve and */
        /* corresponding point on the adjacent curve (one curve below). */
        pt_diff0 = (float)fabs( (double)(data_db[sys_index][pt_index] -
                                 data_db[sys_index_next][pt_index]) );

/* Calculate diff. between point on this curve and */
        /* corresponding point on the adjacent curve (one curve below). */
        pt_diff1 = (float)(data_db[sys_index][pt_index] -
                           data_db[sys_index_next][pt_index]);

/* Calculate diff. between next point on this curve and */
        /* corresponding point on the adjacent curve (one curve below). */
        pt_diff2 = (float)(data_db[sys_index][pt_index + 1] -
                           data_db[sys_index_next][pt_index + 1]);

/* If the difference is less than the delta or the sign of */
        /* of the differences of the adjacents points are opposite */
        /* the curves cross each other, process accordingly.       */
        if (   (pt_diff0 <= cross_delta)
            || ( (pt_diff1 < 0) && (pt_diff2 > 0) && (pt_index < (profile_index-1)) )
            || ( (pt_diff1 > 0) && (pt_diff2 < 0) && (pt_index < (profile_index-1))))
        {
            /* Move to the curve below. */
            sys_index = sys_index_next;
            sys_index_next--;

/* Remember where switch occurred. */
            last_switch_pt = pt_index;
        }
```

```
/* Place current point in final profile.*/
data_db_final[pt_index] = data_db[sys_index][pt_index];
data_curve[pt_index] = sys_index;

/* Check to see if in the 'noise' region. */
max_diff = (float)fabs( (double)(data_db_final[local_max_index] -
                                  data_db[sys_index][pt_index]) );

/* If near noise region, set flag. */
if (    (max_diff > noise_level)
     && (stddev[sys_index] > noise_std) )
{
    in_noise = TRUE;
}

/* Move to the next point. */
pt_index++;

/* Checking for a 'bad' curve and correct if necessary. */
if (pt_index == profile_index)
{
    pt_index = last_switch_pt;

/* No curve underneath touches current curve */
    /* and still haven't found 1st curve.        */
    if (    (sys_index_next == 0)
         && (sys_index > (num_curves - curve_start)) )
    {
        sys_index--;
        sys_index_next = sys_index - 1;
        pt_index = local_max_index;
        last_switch_pt = pt_index;
    }
    /* Else if found 1st curve and no curve underneath */
    /* touches current curve. - ERROR condition.       */
    else if (sys_index_next == 0)
    {
        /* Report error. */
        return(1);
    }
    /* Else, proceed to the next curve below for comparison. */
    else
    {
        sys_index_next--;
    }
}

}

/* In noise, just follow current curve to finish. */
else
{
    /* Place current point in final profile.*/
    data_db_final[pt_index] = data_db[sys_index][pt_index];
    data_curve[pt_index] = sys_index;

/* Move to the next point. */
    pt_index++;
}

} return(0);

}
```

From the overall system beam profile 20, acoustic peak to noise and detail resolution QIQ measurements can be determined. Data collection is then acquired for a cystic clearing QIQ measurement using an appropriate source code listing, such as that following.

```
/*
*SS compute_b_cystic_data
* DESCRIPTION:    This procedure will calculate a dB value for
*                 an ROI based on the b mode mean grey
*                 value of the ROI passed to this routine.
*
* ALGORITHM:
*
* OPERATOR FEEDBACK:
*
* GLOBAL VARIABLES:
* Name            Description (Read/Write)
*
*S!
* SPECIAL TEST CONSIDERATIONS BEYOND UNIT TEST:
*
* TEST PROCESS:
*SEND S!
*
*SS
* AUTHOR          DATE           COMMENT
* D. Kurzynski    20-JUL-94      Created Routine
*
*SEND &@
*/
void
compute_b_cystic_data(    /* Calculate dB values for ROI   */
INT16   *dyn_range_b_     /* Dynamic range input           */
        skey,
float   mean,             /* Mean value for ROI            */
float   *db_value         /* Returned db value for ROI     */
}
/*SEND $$ */
{
float    coef_a;          /* Coefficient storage variables. */
float    coef_b;          /* Coefficient storage variables. */
float    coef_c;          /* Coefficient storage variables. */
double   temp_var;        /* Temporary calculation variable.*/
int      dyn_index;       /* Loop index                     */
/* Init index to find dynamic range parameters from table. */
dyn_index = 0;
/* Loop through dynamic range table until current setting found. */
while { {(dyn_index < DYN_RNG_MAX_SIZE}
&& (dyn_rng_coef_tbl.rec[dyn_index]
.dyn_rng ! = *dyn_range_b_skey) )
{
    dyn_index++;
}
/* Store current dynamic range table settings. */
coef_a = dyn_rng_coef_tbl.rec
[dyn_index].coef_a;
coef_b = dyn_rng_coef_tbl.rec
[dyn_index].coef_b;
coef_c = dyn_rng_coef_tbl.rec
[dyn_index].coef_c;
/* Convert from pixel to db. */
temp_var = {mean − ocef_a}/coef_b;
temp_var = pow ( (double)10, (double) (temp_var) ) − coef_c:
*db_value = (float)(20 * log10(temp_var) );
return;
}
```

Figure 3:
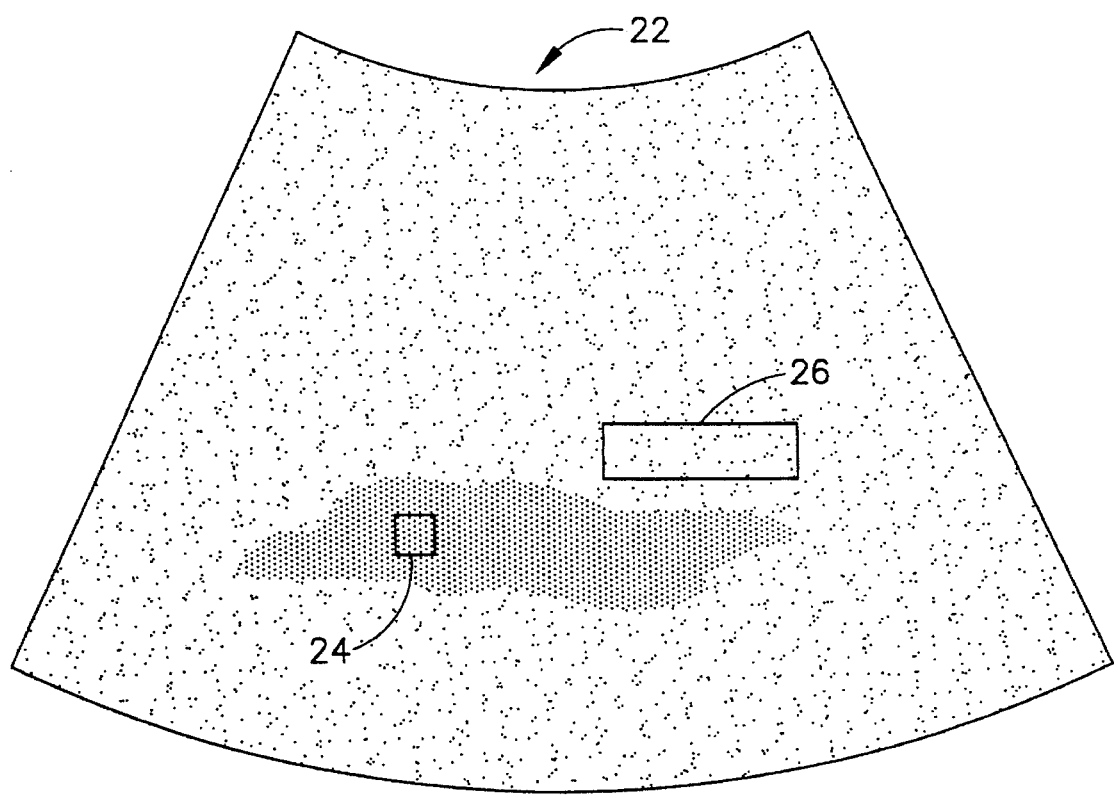
FIG. 3 illustrates cystic clearing determinations for the system in accordance with the present invention.

As illustrated in FIG. 3, an ultrasound image 22 is displayed on a screen. A clinician places two Regions of Interest (R.O.I.) 24 and 26 on the image. One region 24 is placed in a "cyst" (darkened region simulating a blood vessel) of the phantom, and the other region 26 is placed in the surrounding "tissue" region (lighter region) of the phantom. The data is then collected, converted to appropriate units and a cystic clearing measurement is calculated. The object is to determine how much echo is received from the dark region 24, as opposed to the lighter region 26, by calculating the ratio of signals between the two.

The invention has been described in detail with particular reference to certain preferred embodiments thereof, but it will be understood that modifications and variations can be effected within the spirit and scope of the invention.

What is claimed is:

1. An automated qualitative image quality method for an ultrasound imaging system comprising the steps of:

using a wire-in-water phantom ultrasound imaging system having a wire target to imitate the ultrasound imaging system;

determining an impulse response of the system, including the steps of putting the wire target in a water tank, setting a transducer to be perpendicular to an axis of the wire target to display a cross-section of the wire, transmitting sound waves into the cross-section of the wire, receiving reflected echoes at different gain settings, using curve fitting to form a system beam profile, and determining acoustic peak to noise and detail resolution qualitative image quality measurements using the system beam profile;

determining a cystic filling of the system; and using the impulse response and the cystic filling of the system to achieve improved image quality for the ultrasound imaging system.

2. An method for improving image quality for an ultrasound imaging system comprising the steps of:

using a wire-in-water phantom ultrasound imaging system having a wire target to imitate the ultrasound imaging system;

determining an impulse response of the system; determining a cystic filling of the system including the steps of defining a first region of interest in a darkened region of an image;

defining a second region of interest in a surrounding region of the image;

collecting data representative of returned echoes from the phantom, at multiple gain settings; and calculating a cystic filling measurement using the collected data; and using the impulse response and the cystic filling of the system to achieve automated qualitative image quality for the ultrasound imaging system.

* * * * *